Nov. 28, 1961 C. B. GRADY, JR 3,011,115
SOLID STATE REGULATED BATTERY CHARGING SYSTEM
Filed Oct. 31, 1960
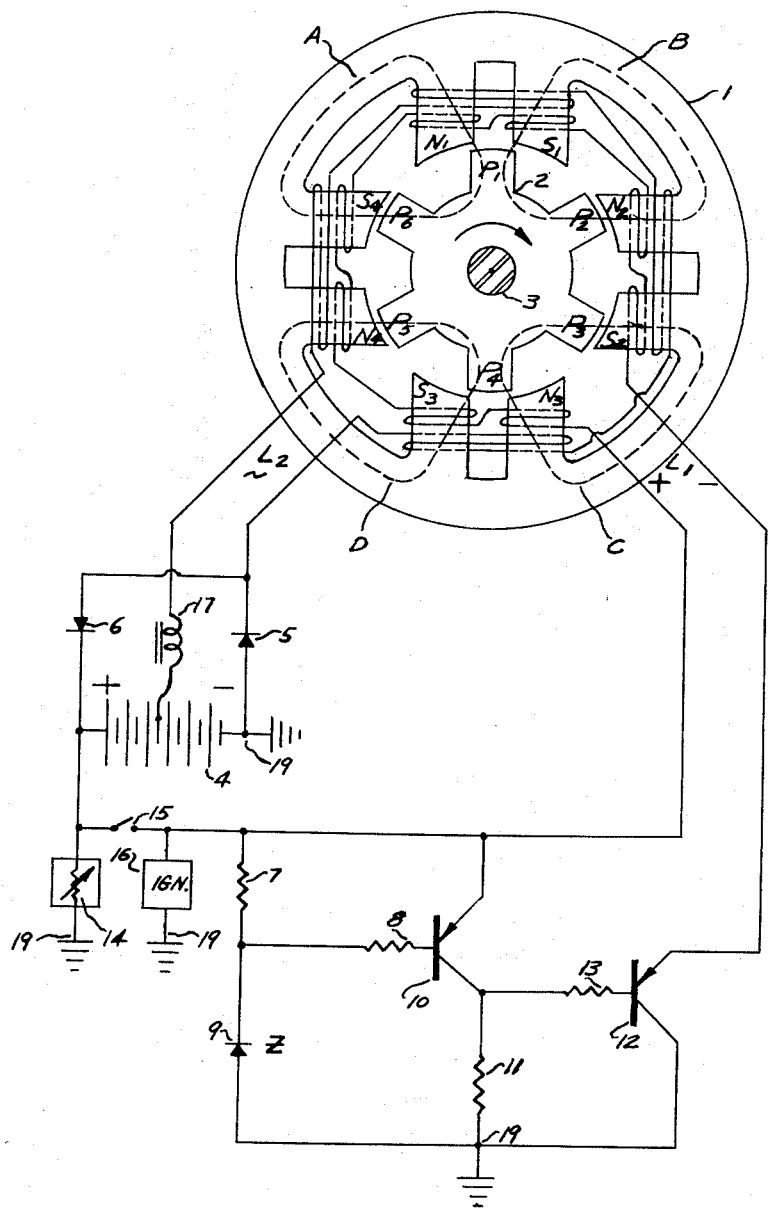
INVENTOR.
Charles B. Grady Jr.

United States Patent Office 3,011,115
Patented Nov. 28, 1961

3,011,115
SOLID STATE REGULATED BATTERY CHARGING SYSTEM
Charles B. Grady, Jr., 1 Ridgeway Ave., West Orange, N.J.
Filed Oct. 31, 1960, Ser. No. 66,031
3 Claims. (Cl. 320—64)

This invention relates to an electrical supply system which controls the charging of a storage battery from an alternating current generator so that a substantially constant battery voltage is maintained in spite of wide variations in battery load or in generator speed.

Such systems are required in many vehicles, such as automobiles and aircraft, and, as pointed out in my copending application No. 61,159, filed October 7, 1960, of which the present application is a continuation in part and improvement thereon, the prevalent means of regulating such systems involves the use of erosion-vulnerable relay contacts.

The present invention overcomes the maintenance, cost, and reliability problems of direct current generator and relay type regulator systems by utilizing the novel center-tapped battery, zener diode voltage control, and current limiting inductive reactance, of the above mentioned copending application, but achieves further economy of manufacture by substituting alternator excitation as the means for modulating the charging voltage, in place of using the saturable reactor of my earlier disclosure.

Thus, in the preferred form of the present invention, a brushless alternator is used of the type which has a stationary direct current exciter winding, and a stationary alternating current output winding. Such generators have an output frequency proportional to the driving speed of rotation, and an output voltage which is a function of both the driving speed and of the excitation current. By causing any voltage in excess of a predetermined zener reference voltage appearing across the battery to be amplified and to diminish the alternator exciting voltage, the present invention accomplishes the control of charging voltage without using the expensive magnetic material required by a saturable reactor.

An object of this invention is to provide an electrical system for maintaining the charge in a storage battery under wide variations of load and speed of input power, in a reliable and inexpensive manner.

A second object is to provide a solid state regulator for battery chargers which obviates the use of saturable reactors.

A third object is to provide an automotive electrical storage battery charging system which controls the voltage of a brushless alternator by varying its excitation in response to the difference between the battery voltage and a zener diode reference voltage.

A fourth object is to provide an automotive electrical storage battery charging system which controls the magnitude and direction of current flowing between the battery and a variable frequency and voltage alternator by using two diodes and an inductive reactance arranged to charge the two halves of the battery during alternate cycles of the alternator.

Other objects are implicit in the accompanying specifications and claims.

The drawing is a schematic diagram of the preferred embodiment of my invention. The alternator frame 1 in the drawing is provided with four pairs of inwardly projecting magnetically permeable poles $N_1S_1$, $N_2S_2$, $N_3S_3$, and $N_4S_4$, while the magnetically permeable rotor 2, driven by input power supplied by a motor (not shown) through shaft 3, is provided with six equally spaced cooperating poles $P_1$, $P_2$, $P_3$, $P_4$, $P_5$, and $P_6$. Each of the six individual stator poles is excited to either north or south magnetization as shown by the series winding $L_1$, which links them all. The alternating current output winding $L_2$ may be seen to link each of the four pairs of stator poles in a series aiding manner, so that a voltage will be generated in the winding linking any pair of poles when the net magnetic flux passing through this pair of poles changes, and the total voltage appearing across $L_2$ will be the sum of the voltages in the four bipolar windings.

As shown in the drawing the rotor is in a neutral position such that the four principal flux linkage paths A, B, C, and D are equal. For instance, as much flux is passing from $N_1$ to $P_1$ as is passing from $P_1$ to $S_1$. However, if rotor 2 with $P_1$ is pictured as displaced 30° about shaft 3 in the counterclockwise direction from the neutral position shown, it will be clear that the flux intensity in path A through $N_1$ will be greater than that in path B through $S_1$.

Conversely, if the pole $P_1$ is pictured as being displaced 30° in the clockwise position from that shown it follows that the flux in path B through $S_1$ will exceed that in path A through $N_1$.

Consequently, since paths A and B are oppositely directed through $P_1$, there will be a flux reversal in each of the bipolar windings composing output winding $L_2$ during each 60° of rotation of the rotor 2. The voltage of the alternating current available at $L_2$ will be dependent on the speed of rotation of shaft 3, and on the total flux density generated by the exciting current flowing in winding $L_1$.

It may be seen that the flux linkages of the exciting windings are such that no net alternating current will be induced at the exciter terminals $L_1$ due to bipolar cancellation.

One side of the alternating current output windings $L_2$ is connected to the center tap of the storage battery 4 through the inductive impedance 17, while the other side is connected to the positive terminal of battery 4 through rectifying diode 6, and to ground 19 and the negative terminal of battery 4 through rectifying diode 5.

In this manner the two halves of battery 4 are charged alternately during successive half cycles of alternator 1. The value of choke 17 is chosen to be such that at the frequency and voltage of the highest speed anticipated for shaft 3, and under full excitation in windings $L_1$ the current to the battery 4 and load 14 will be limited to the maximum rated generator capacity. The inductive properties of 17 automatically provide regulation for a given capacity since, as the speed and voltage of the alternator 1 increase, the frequency and therefore the impedance of inductor 17 also increases to keep the current constant without additional dissipation of power, except for negligible losses.

Closure of the ignition switch 15 energizes the ignition system 16 of the motor (not shown) which drives the alternator shaft 3. Simultaneously, battery power flows through switch 15 to energize the exciter winding $L_1$ of alternator 1 through the emitter and collector of power transistor 12.

In the drawing the circuit component 9 is a zener diode having a characteristic zener breakdown potential slightly above the normal battery potential. If, for instance, battery 4 is a 12.6 volt battery, the diode 9 would be chosen to have a zener potential of 13.0 volts.

Consequently, as long as the voltage across the battery 4 is below the zener potential of diode 9 negligible current will flow through resistor 7 and, consequently, the base of the amplifier PNP transistor 10 will be at its emitter potential thereby placing it in its cut-off condition in which negligible current will flow through transistor 10. Under these circumstances the emitter follower power transistor 12 will be in its "on" or conductive condition so that alternator exciter winding $L_1$ receives full excitation from battery 4.

However, as soon as the potential across battery 4 rises above the zener potential of diode 9 due to overcharging by alternator 1, current will begin to flow through resistor 7 thereby making the base of PNP transistor 10 more negative and causing it to pass current through the load resistor 11. The consequent voltage drop in 11 then biases the base of emitter-follower power diode 12 more positively, so as to diminish the current it is supplying to the exciter windings $L_1$. This action in turn diminishes the voltage generated by alternator 1, and the servo loop is complete. Resistors 8 and 13 are limiting protective resistors for transistors 10 and 12, respectively.

As many changes may be made in the above charging system, and many widely different embodiments of this invention could be made without departing from the scope of the claims, it is intended that all matter contained in the above description shall be interpreted as illustrative and not in a limiting sense.

Having now particularly described and ascertained the nature of the invention, and in what manner the same is to be performed, what is claimed is:

1. In a regulating battery charging system, the combination comprising an alternator, an exciting field coil for said alternator, an alternating current output winding for said alternator, an inductive reactance, a center tapped storage battery, a first rectifying diode, a second rectifying diode, first circuit means for impressing the voltage appearing across said output winding through said reactance between the center tap of said battery and each of the end terminals of said battery through one of said rectifying diodes, a zener diode, second circuit means for impressing the voltage appearing across said battery on said zener diode, direct current supply means for said exciting field coil, and means responsive to the current in said second circuit means for modulating the exciting current flowing in said field coil.

2. In a charging system in accordance with claim 1, said means responsive to the current in said second circuit means including a transistor.

3. In a charging system in accordance with claim 1, said means responsive to the current in said second circuit means comprising a first load resistor in series with said zener diode, a first amplifying transistor whose base is biassed by the potential appearing across said first load resistor, a second load resistor for said first transistor, and a second transistor connected in the emitter follower configuration having the said exciting field winding as its load and including said second load resistor in its base biassing circuit.

No references cited.